United States Patent [19]

Taneda et al.

[11] 4,030,614

[45] June 21, 1977

[54] RECIPROCAL TRANSFER APPARATUS

[75] Inventors: Yukinori Taneda, Yokohama; Takashi Kobayashi, Fujisawa, both of Japan

[73] Assignee: Hitachi, Ltd., Japan

[22] Filed: Feb. 13, 1976

[21] Appl. No.: 658,066

[30] Foreign Application Priority Data

Feb. 14, 1975 Japan .............................. 50-17932

[52] U.S. Cl. ............................................. 214/1 BT
[51] Int. Cl.² ......................................... B65G 47/91
[58] Field of Search ......................... 214/1 BB, 1 BT

[56] References Cited
UNITED STATES PATENTS

| 3,341,928 | 9/1967 | Naumann | 214/1 BT X |
| 3,818,769 | 6/1974 | Tigner et al. | 214/1 BB X |
| 3,865,253 | 2/1975 | Healy | 214/1 BT |
| 3,881,362 | 5/1975 | Beezer | 214/1 BB X |
| 3,921,820 | 11/1975 | Crockett | 214/1 BB |

Primary Examiner—Frank E. Werner
Attorney, Agent, or Firm—Craig & Antonelli

[57] ABSTRACT

A pick and place unit adapted to hold an article at an article feeding position, elevate the article to a predetermined height, subsequently transport the article in the horizontal direction to a place above an assembling position, let down the article vertically to the assembling position, and release the article, wherein the respective operations of elevation, horizontal movement and let-down can be effected in good order by the output of a single driving device.

4 Claims, 12 Drawing Figures

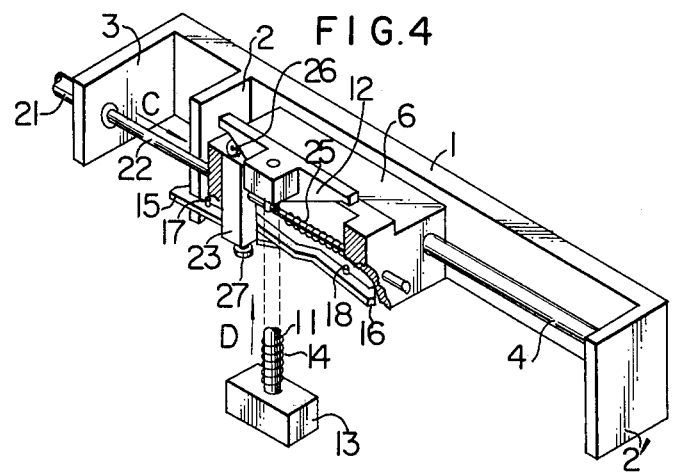
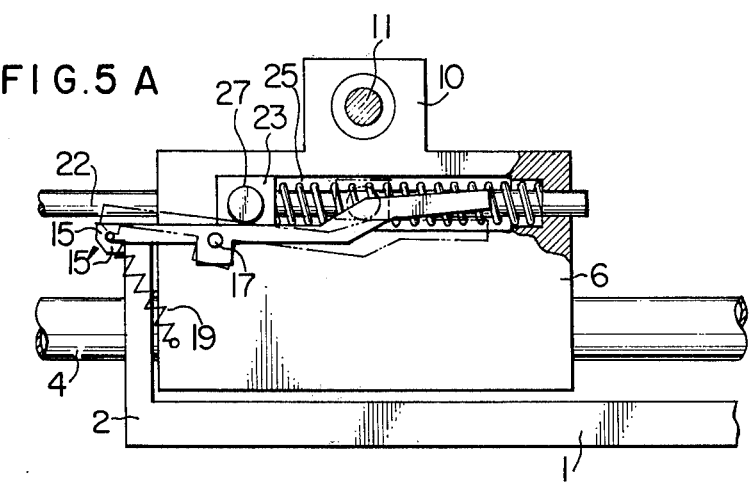
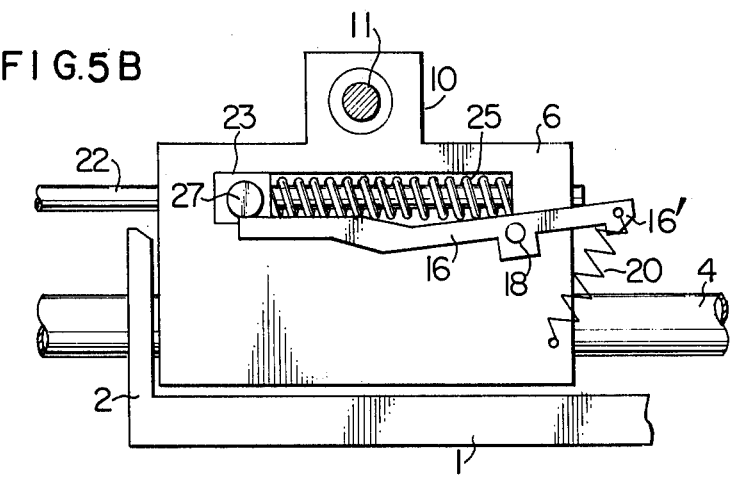

RECIPROCAL TRANSFER APPARATUS

BACKGROUND OF THE INVENTION

This invention relates to a pick and place unit which picks up an article at a first predetermined position and transports it to a second predetermined position. Heretofore, one driving device for vertical movement and the other driving device for horizontal movement have been separately used for a pick and place unit, which is adapted to insert an article having been supplied at a predetermined position into a jig or the like waiting ready for at a predetermined position apart from the original position of the article by moving the article along a path of an inverted letter 'U'. In the case of using two driving devices including one driving device for vertical movement and the other for horizontal movement as described above, a sequence control system has been adopted for securing the two driving devices to operate in good order. For this, the pick and place unit has been enlarged in size and complicated in construction. Additionally, with such a pick and place unit, the time required for a cycle of motion is long, and a high speed motion cannot be effected. Further, such a disadvantage has been presented that the provision of a sequence control system resulted in a costly unit.

An object of the present invention is to provide a pick and place unit capable of transporting an article along a path of an inverted letter U in good order by use of a single driving device and a simplified mechanism driven by said device without using a special control system and a plurality of driving devices.

Other objects and advantages of the present invention will become apparent in consideration of the ensuing description and the accompanying drawings.

SUMMARY OF THE INVENTION

According to the present invention, there is provided a pick and place unit which comprises a movable frame supported on a stationary frame for reciprocatory movement of a predetermined distance, a first mechanism for engaging the movable frame to the stationary frame at the opposite ends of the travel of the movable frame, a second mechanism having a chuck for holding an article to be transported and supported by the movable frame for movement in the direction perpendicular to the travel of the movable frame and a single driving device for moving a driving block in the direction of the travel of the movable frame, said two mechanisms being sequentially operated by the driving block.

BRIEF DESCRIPTION OF THE DRAWINGS

FIG. 4 is a partial cross-sectional perspective view of the pick and place unit of FIG. 1 at the left end of travel;

FIG. 5A is a partial cross-sectional view of the pick and place unit of FIG. 4 illustrating the respective locking and release positions of a first hook of the unit;

FIG. 5b is a partial cross-sectional view of the pick and place unit of FIG. 4 illustrating the position of a second hook of the unit;

DESCRIPTION OF THE PREFERRED EMBODIMENT

Figure 1:
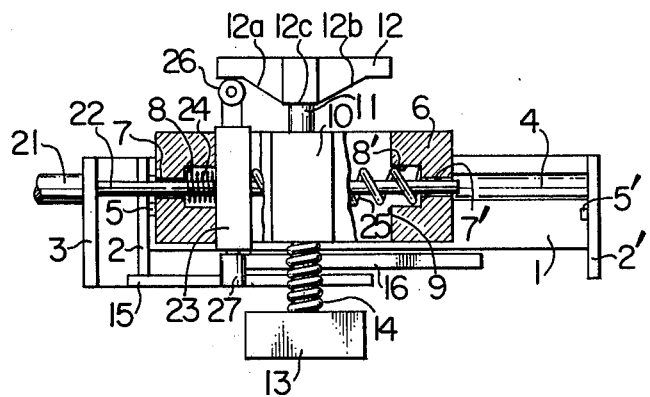
FIG. 1 is a front view, partially sectional, of a pick and place unit embodying the present invention.
Figure 2:
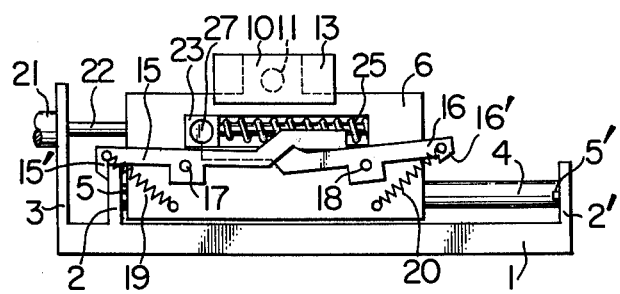
FIG. 2 is a bottom view of FIG. 1.
Figure 3:
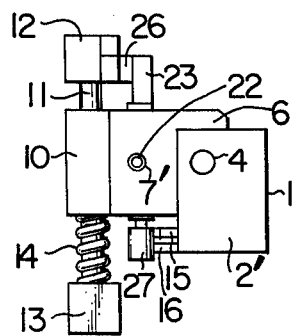
FIG. 3 is a right side view of FIG. 1.

FIG. 1 through FIG. 9 show an embodiment of the present invention. Referring to the drawings, designated at 1 is a stationary frame integrally formed with a pair of spaced plates 2, 2' and a side plate 3. Provided between the plates 2 and 2' is a guide bar 4 consisting, for example, of a ball spline shaft. Stoppers 5, 5' are provided on the plates 2, 2' at the surfaces thereof facing to each other. a movable frame 6 is slidably supported on the guide bar 4 and is adapted to travel between the stoppers 5 and 5'. The movable frame 6 is penetratingly provided therein with holes 7, 7' through which a driving shaft extends in the sliding direction of the movable frame 6, holes 8, 8' for housing springs in the direction coaxial with the holes 7, 7', and a slot 9 maintained in communication with the holes 8, 8' and extending through the movable frame 6 in the direction perpendicular to the sliding direction of the movable frame 6. Additionally, the movable frame 6 is provided in front thereof with a projection 10. The projection 10 is slidably provided therethrough with a lifting shaft 11 consisting of a ball spline shaft and slidable in the direction perpendicular to the sliding direction of the movable frame 6. A cam 12 is secured to the upper end of the lifting shaft 11 and a chuck 13 to the lower end thereof. Further, inserted between the lower face of the projection and the chuck 13 is a spring 14 which is urging downwardly the lifting shaft 11 to which the cam 12 and the chuck 13 are secured. A pair of hooks 15, 16 each being adapted are secured. A pair of hooks 15, 16 each being adapted to engage the movable frame 6 with the plates 2, 2' of the stationary frame 1 at opposite ends of travel of the movable frame 6 are rotatably supported by pins 17, 18 studded at positions apart from each other on the lower face of the movable frame 6. The hooks 15 and 16 are provided with turning force by springs 19 and 20 respectively. 21 indicates a hydraulic or pneumatic operated cylinder fixed at the side plate 3 and operating as a driving device. 22 indicates a driving shaft connected to the piston of the cylinder 21, extending through holes 7, 7' and 8, 8' and the slot 9 of the movable frame 6, and capable of sliding separately of the movable frame 6. 23 denotes a driving block slidably supported in the slot 9 of the movable frame 6, fixed on the driving shaft 22, and sliding in the movable frame 6 simultaneously with the driving shaft 22. A pair of springs 24 and 25 are mounted between the driving block 23 and the holes 8 and 8' of the movable frame 6. 26 indicates a cam follower rotatably supported on the upper end of the driving block 23, and constructed so as to urge up the cam 12 against urging force of the spring 14. 27 is also a cam follower rotatably supported on the lower end of the driving block 23, and constructed so as to rotate the hooks 15 and 16 against tensile force of the springs 19 and 20, and release the engagement of the stationary frame 1 with the movable frame 6 through the hooks 15 and 16.

Figure 6:
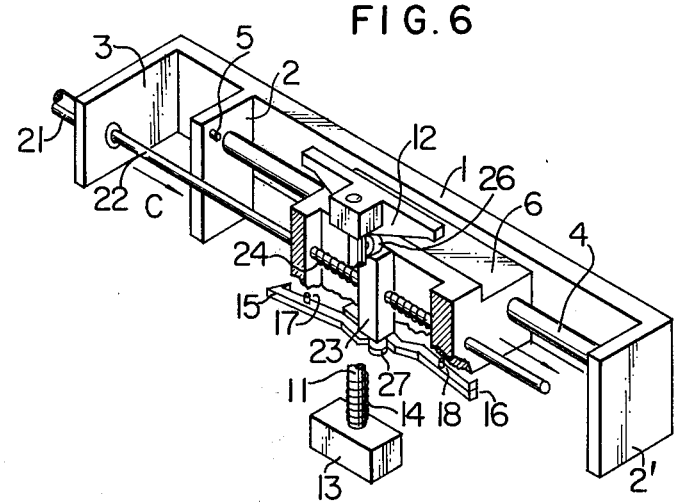
FIG. 6 is a partial cross-sectional perspective view of the pick and place unit of FIG. 1 illustrating the position of a movable frame travelling in a horizontal direction.
Figure 7A:
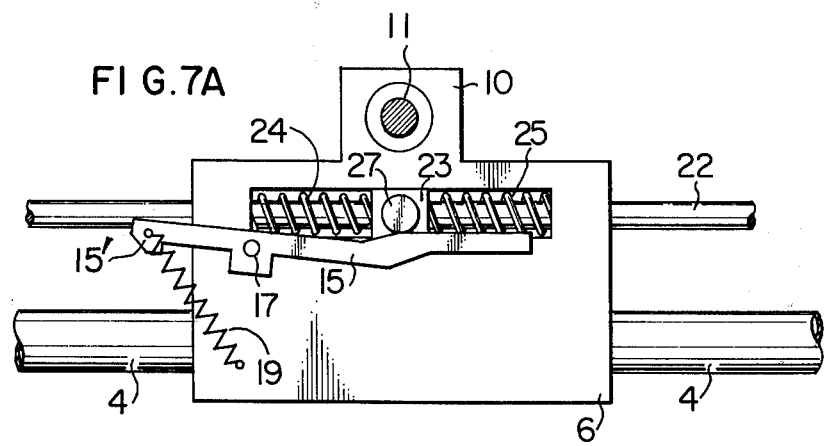
FIG. 7a is a partial cross-sectional view of the pick and place unit of FIG. 6 illustrating the position of the first locking hook during the horizontal travel of the unit.
Figure 7B:
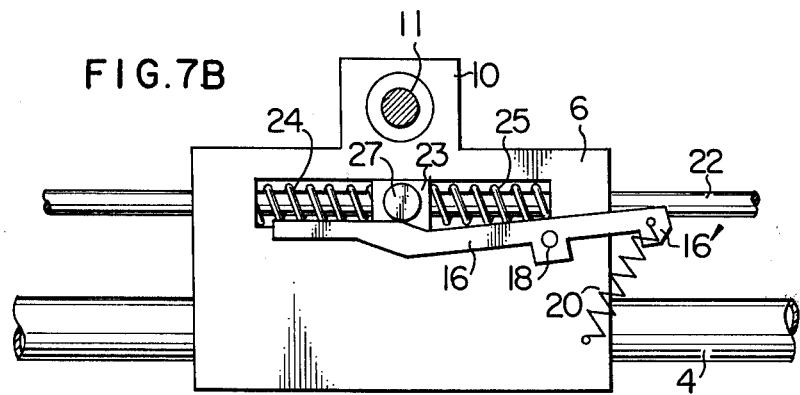
FIG. 7B is a partial cross-sectional view of the pick and place unit of FIG. 6 illustrating the position of the second locking hook during the horizontal travel of the unit.
Figure 8:
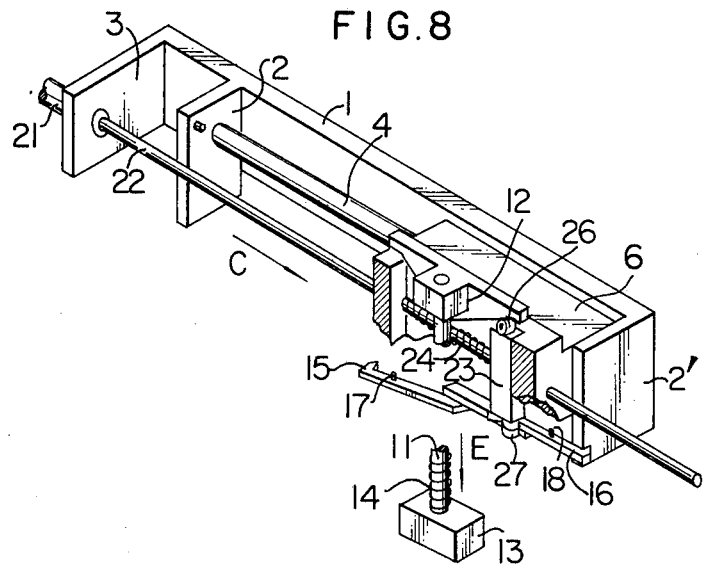
FIG. 8 is a partial cross-sectional perspective view illustrating the position of the movable frame at the right end of travel.
Figure 9A:
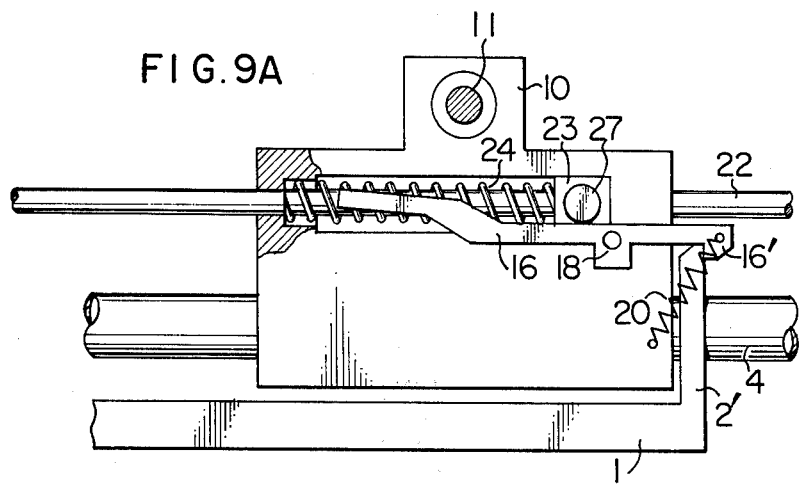
FIG. 9A is a partial cross-sectional view of the pick and place unit of FIG. 8 illustrating the position of the second locking hook at the right end of travel of the unit.
Figure 9B:
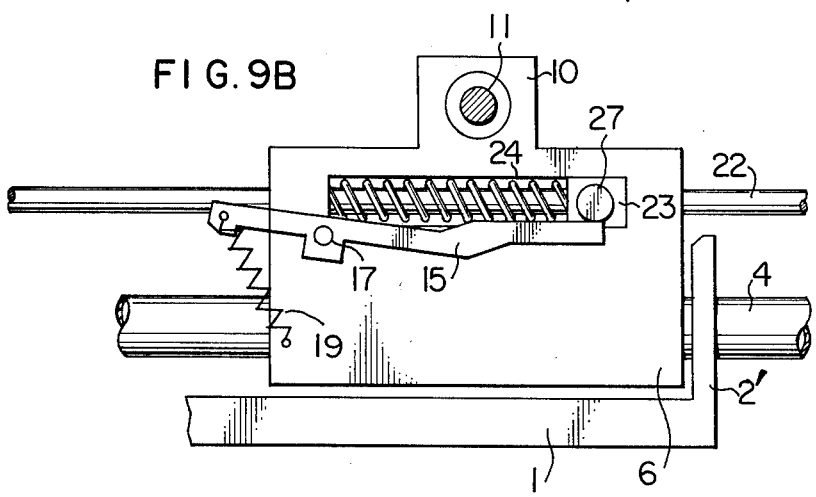
FIG. 9B is a partial cross-sectional view of the pick and place unit of FIG. 8 illustrating the position of the first hook at the right end of travel of the unit.

In the arrangement described above, when the movable frame 6 is at the left end of travel in the stationary frame 1 as shown in FIG. 4, the hook 15 engages with the plate 2 of the stationary frame 1 as shown in FIG. 5A and engages the movable frame 6 with the stationary frame 1. In this condition, when the cylinder 21 is actuated to travel the driving shaft 22 in the direction indicated by an arrow C, only the driving block 23 fixed on the driving shaft 22 is moved to urge up the cam 12 along a first slant portion 12a by means of the cam follower 26 and pull up the chuck 13 in the direction indicated by an arrow D by way of the lifting shaft 11. When the cam follower 26 reaches a flat portion 12c of the cam, then the chuck 13 reaches the uppermost end, and at the same time, the hook 15 is rotated by the cam follower 27 so that a pawl 15' is disengaged from the plate 2. Then, the hook 15 is brought into the condition shown by the two-dot chain lines in FIG. 5A. When the engagement between the stationary frame 1 and the movable frame 6 is thus released, as the driving shaft 22 travels in the direction indicated by the arrow C, the movable frame 6 together with the driving block begins to travel from the left end of travel to the right along the guide bar 4 as shown in FIG. 6. The travel of the movable frame 6 is caused because the movable frame 6 is pushed by the spring 25 which is pushed by the driving block 23. At this time, the hooks 15 and 16 are brought into the condition shown in FIGS. 7A and 7B. Consequently, the chuck 13 travels horizontally at the upper position. When the movable frame 6 reaches the right end of the travel in the stationary frame 1 as shown in FIG. 8, the movable frame 6 abuts against the stopper 5 provided on the plate 2 to stop the travel. When the driving shaft 22 travels further in the direction indicated by the arrow C after the stop of the movable frame 6, the driving block 23 travels further in the direction indicated by the arrow C, compressing the spring 25. Then, the engagement between the hook 16 and the cam follower 27 is released, the hook 16 is rotated by means of the spring 20, the pawl 16' engages with the plate 2' of the stationary frame 1, as shown in FIG. 9A, to engage the movable frame 6 with the stationary frame 1. At the same time, the cam 12, the lifting shaft 11 formed integrally thereon and the chuck 13 are let down in the direction indicated by an arrow E, being guided by the cam follower engaged with a second slant portion 12b of the cam 12 through the agency of elastic force of the spring 14. The chuck 13 can be caused to perform the inverted letter U motions by means of the single cylinder 21 in the manner described above. Needless to say that the letter U motions can be performed by the modification in the trapezoidal contour of the cam. In the embodiment described above, description was given of the case that the movable frame 6 is travelled from the left end of travel to the right end of travel in the stationary frame 1. However, in the case that the movable frame 6 is to be travelled from the right end of travel to the left end of travel in the stationary frame 1, the operations of the embodiment described above are entirely reversed by travelling the driving shaft 22 toward the cylinder 21 or in the direction opposite to that indicated by the arrow C, thereby causing the chuck 13 to perform the inverted letter U motions.

Additionally, in the embodiment described above, description was given of the case that the cylinder 21 is used as the driving device. However, it goes without saying that the use of any system can accomplish the same results as in the above embodiment as far as said system has a mechanism adapted to cause the driving shaft 22 to slidably reciprocate in the axial direction thereof for a required distance.

Further, in the above embodiment, the guide bar 4 and lifting shaft 11 both of which consist of ball spline shafts are used. However, a plurality of ordinary shafts may be used instead of those ball spline shafts, and needless to say that the same results can be accomplished by preventing the rotations of the movable frame 6 and the chuck 13 by use of other means.

Furthermore, it is not necessarily required to secure the driving device to the stationary frame 1, and it goes without saying that the driving shaft can be connected to the driving device which is secured to any other portion of the system for which is used the pick and place unit according to the present invention.

Additionally, it is not necessarily required to form the plate 2 constituting a stop member of the stationary frame 1 integrally on the stationary frame 1, and needless to say that the plate 2 can be moved to any desired position and fixed there.

According to the present invention, the horizontal travelling distance of the chuck can be defined by determining the distance between a pair of stop members, and the vertical travelling distance of the chuck can be defined by determining the travelling lengths of the cam along the first and second slant portions. Hence, according to the present invention it is possible to easily attain the performance of the letter U motions or the inverted letter U motions.

What is claimed is:

1. A pick and place unit comprising:
   a stationary frame provided thereon with a pair of plates and guide members;
   a movable frame for which ends of travelling distance are defined by said pair of plates and supported slidably in a predetermined direction by the guide members;
   a pair of hooks rotatably supported on said movable frame, provided with rotating force by means of springs, and adapted to engage the movable frame with the stationary frame by engaging with said plates of the stationary frame at the ends of travel of the movable frame;
   a lifting shaft supported by said movable frame slidably in the direction perpendicular to the sliding direction of said movable frame, and biased in one direction by means of a spring;
   a cam fixed on one end of said lifting shaft;
   a chuck for holding an article to be moved and fixed on the other end of said lifting shaft;
   a driving shaft slidably extending through said movable frame in the sliding direction of said movable frame;

a driving block extending through said movable frame in the direction perpendicular to the sliding direction of said movable frame, mounted on the movable frame through a pair of springs, slidably provided in the sliding direction of the movable frame, and fixed on said driving shaft;

a cam follower rotatably supported by one end of said driving block, engaging with said cam, and elevating or lowering said lifting shaft by the travel of the driving block;

another cam follower rotatably supported on the other end of said driving block, engaging with said hooks, and rotating said hooks by the travel of the driving block, thereby causing the movable frame and the stationary frame to be engaged or disengaged with or from each other; and a driving device for causing said driving shaft to slide in the sliding direction of the movable frame.

2. A pick and place unit comprising:

a stationary frame having stop members thereon at a pair of positions apart from each other for a predetermined distance;

a movable frame mounted on said stationary frame so as to be able to horizontally, reciprocatingly move between said stop members;

a chuck for holding an article and mounted on said movable frame so as to be able to reciprocatingly move in vertical direction;

a driving block mounted on said movable frame so as to be able to reciprocatingly move in horizontal direction;

a cylinder means supporting said driving block at a piston rod end thereof and moving said driving block in horizontal direction;

a first cam mechanism consisting of a cam, a cam follower and a spring tightly attaching said cam and said cam follower, one of said cam, or cam follower being connected to said driving block, the remaining of said cam or cam follower being connected to said chuck, and said cam having a first slant portion along which said cam monotonously advances in one vertical direction as the cam follower followingly advances in one horizontal direction, a flat portion along which said cam advances in said one horizontal direction upon reaching a predetermined vertical position, and a second slant portion along which thereafter said cam recedes in said one vertical direction, whereby said chuck is caused to advance and recede in vertical direction by the horizontal travelling of the driving block;

a pair of hooks mounted on said movable frame and having pawl portions respectively engaging a pair of stop members of said stationary frame; and a second cam mechanism mounted on said driving block, causing the pawl portions of said hooks to stay at the position, being incapable of engaging the stop members, while said cam follower stays at the flat portion of the cam and causing said pawl portions to stay at the position, being capable of engaging the stop members, while said cam follower stays in the first and second slant portions during the horizontal movement of said driving block; and arranged such that:

said cylinder means can cause the chuck to advance in one vertical direction, advance in one horizontal direction and recede in one vertical direction or to perform so-called letter U motions only by making the driving block monotonously advance in one horizontal direction.

3. A pick and place unit, as set forth in claim 2, further provided with a spring between the driving block and the movable frame in order to transmit the horizontally moving force of the driving block to the movable frame when said cam follower engages with the cam at the flat portion.

4. A pick and place unit as set forth in claim 2, constructed such that:

said movable frame is provided therethrough with a vertical through-hole and a lifting shaft slidably inserted through said through-hole;

said lifting shaft being provided at one end with said chuck and at the other end with said cam;

the spring of said first mentioned cam mechanism being inserted between the chuck and the movable frame;

said cam follower being mounted on the driving block; and the cam being brought in tight contact with the cam follower by means of said spring.

* * * * *